2,992,897
PREPARATION OF CARBONYL SULFIDE

Fred Applegath and Raymond A. Franz, El Dorado, Ark., assignors to Monsanto Chemical Company, St. Louis, Mo., a corporation of Delaware
No Drawing. Filed Jan. 2, 1959, Ser. No. 784,443
11 Claims. (Cl. 23—203)

This invention pertains to carbonyl sulfide (COS) and more particularly to a method for its preparation.

It is well known in the art that COS can be prepared by the reaction of carbon monoxide and sulfur at very high temperatures, such as from 675° to 840° C. The reaction does not proceed at low temperatures. No COS is formed by passing CO through molten sulfur at low temperatures, such as from 130° to 240° C. It is an object of this invention to provide a process for producing COS at relatively low reaction temperatures. Other objects will become apparent from the description of the invention.

It has now been discovered that COS can be prepared by reacting carbon monoxide and sulfur in a liquid monohydric or polyhydric alcohol, preferably containing from 1 to 12 carbon atoms, having dispersed therein an alkali metal or alkaline earth metal sulfide or bisulfide. The following examples illustrate this invention.

EXAMPLE I

Into a 1.8 liter stainless steel bomb was charged 200 ml. of solvent, 11.2 g. of a basic sulfide, 16 g. of sulfur and 12 g. of CO. The bomb was heated to 100° C. and, after the reaction, the product gas was analyzed with the results shown in Table A.

Table A

| Solvent | Sulfide | Reaction time, hrs. | Mol percent COS in product gas |
|---|---|---|---|
| Methanol | NaHS | 2 | 44.0 |
| Ethylene glycol | NaHS | 2 | 30.2 |
| Isopropanol | NaHS | 1 | 51.0 |

EXAMPLE II

The procedure set forth in Example I is repeated using kerosene as the solvent. The product gas contained only 0.6 mol percent COS.

EXAMPLE III

The procedure set forth in Example I is repeated using ethanol as the solvent. A good yield of COS is obtained.

EXAMPLE IV

The procedure set forth in Example I is repeated using n-propanol as the solvent and potassium acid sulfide in place of the sodium acid sulfide. A good yield of COS is obtained.

EXAMPLE V

The procedure set forth in Example I is repeated using isobutanol as the solvent and lithium sulfide in place of the sodium acid sulfide. A good yield of COS is obtained.

EXAMPLE VI

The procedure set forth in Example I is repeated using tert.-butanol as the solvent and sodium sulfide in place of the sodium acid sulfide. A good yield of COS is obtained.

EXAMPLE VII

The procedure set forth in Example I is repeated using sec.-butanol as the solvent and calcium sulfide in place of the sodium acid sulfide. A good yield of COS is obtained.

EXAMPLE VIII

The procedure set forth in Example I is repeated using n-pentanol as the solvent and sodium sulfide in place of the sodium acid sulfide. A good yield of COS is obtained.

EXAMPLE IX

The procedure set forth in Example I is repeated using 2-methylpentanol as the solvent and calcium acid sulfide in place of the sodium acid sulfide. A good yield of COS is obtained.

EXAMPLE X

The procedure set forth in Example I is repeated using n-hexanol as the solvent and magnesium sulfide in place of the sodium acid sulfide. A good yield of COS is obtained.

EXAMPLE XI

The procedure set forth in Example I is repeated using n-heptane as the solvent and barium acid sulfide in place of the sodium acid sulfide. A good yield of COS is obtained.

EXAMPLE XII

The procedure set forth in Example I is repeated using n-octanol as the solvent and barium sulfide in place of the sodium acid sulfide. A good yield of COS is obtained.

EXAMPLE XIII

The procedure set forth in Example I is repeated using 2-ethylhexanol as the solvent and magnesium acid sulfide in place of the sodium acid sulfide. A good yield of COS is obtained.

EXAMPLE XIV

The procedure set forth in Example I is repeated using trimethylhexanol as the solvent and potassium sulfide in place of the sodium acid sulfide. A good yield of COS is obtained.

EXAMPLE XV

The procedure set forth in Example I is repeated using n-decanol as the solvent and lithium acid sulfide in place of the sodium acid sulfide. A good yield of COS is obtained.

EXAMPLE XVI

The procedure set forth in Example I is repeated using glycerine as the solvent. A good yield of COS is obtained.

EXAMPLE XVII

The procedure set forth in Example I is repeated using dodecanol as the solvent. A good yield of COS is obtained.

EXAMPLE XVIII

The procedure set forth in Example I is repeated using propylene glycol as the solvent. A good yield of COS is obtained.

EXAMPLE XIX

The procedure set forth in Example I is repeated using hexamethylene glycol as the solvent. A good yield of COS is obtained.

EXAMPLE XX

The procedure set forth in Example I is repeated using ethylene glycol monomethyl ether as the solvent. A good yield of COS is obtained.

EXAMPLE XXI

The procedure set forth in Example I is repeated using ethylene glycol monoethyl ether as the solvent. A good yield of COS is obtained.

EXAMPLE XXII

The procedure set forth in Example I is repeated using ethylene glycol monobutyl ether as the solvent. A good yield of COS is obtained.

EXAMPLE XXIII

The procedure set forth in Example I is repeated using diethylene glycol as the solvent. A good yield of COS is obtained.

EXAMPLE XXIV

The procedure set forth in Example I is repeated using triethylene glycol as the solvent. A good yield of COS is obtained.

EXAMPLE XXV

The procedure set forth in Example I is repeated using tetraethylene glycol as the solvent. A good yield of COS is obtained.

In carrying out the process of this invention the reaction temperature can be varied substantially. Temperatures as low as 25° C. and as high as 300° C. can be used with temperatures within the range of from about 70° C. to about 150° C. being preferred. Similarly, the reaction pressure can also be varied considerably. Atmospheric pressure can be used although elevated pressures are most suitable. A pressure of at least 50 p.s.i.g. is preferred and pressures as high as 1000 p.s.i.g. can be used if desired.

Considerable variation in the quantities of reactants is possible. Sulfur is generally employed in excess of the stoichiometric quantities for practical reasons. Either may be used in excess as the quantities are not a critical factor. The quantity of the alkaline earth or alkali metal sulfide or bisulfide employed can be varied from about 0.05 to about 1 part by weight for each part by weight of sulfur employed. The quantity of solvent employed is not critical but should be sufficient to provide a good dispersion of reactants and a fluid reaction medium to permit intimate contact of the reactants.

The reaction can be carried out as a batch reaction or as a continuous process in a suitable column providing for continuous concurrent or countercurrent contact. The COS can be recovered from the product gases by any technique well known to those skilled in the art. The reaction gases can be cooled to Dry Ice temperature and the COS condensed therefrom as a liquid or it can be recovered by solvent extraction.

What is claimed is:

1. A process for preparing carbonyl sulfide which comprises reacting carbon monoxide and sulfur in an aliphatic alcohol having dispersed therein a compound selected from the group consisting of alkali metal and alkaline earth metal sulfides and bisulfides at a temperature ranging from about 25° C. to about 300° C.

2. The process as described in claim 1 wherein the alcohol contains from 1 to 12 carbon atoms.

3. A process for preparing carbonyl sulfide which comprises reacting carbon monoxide and sulfur in an aliphatic alcohol having dispersed therein an alkali metal bisulfide at a temperature ranging from about 25° C. to about 300° C.

4. A process as described in claim 3 wherein the alcohol is methanol.

5. A process as described in claim 4 wherein the alkali metal bisulfide is sodium bisulfide.

6. A process as described in claim 3 wherein the alcohol is isopropanol.

7. A process as described in claim 6 wherein the alkali metal bisulfide is sodium bisulfide.

8. A process as described in claim 3 wherein the alcohol is ethylene glycol.

9. A process as described in claim 8 wherein the alkali metal bisulfide is sodium bisulfide.

10. A process for preparing carbonyl sulfide which comprises reacting carbon monoxide and sulfur in an aliphatic alcohol having dispersed therein an alkali metal sulfide at a temperature ranging from about 25° C. to about 300° C.

11. A process for preparing carbonyl sulfide which comprises reacting carbon monoxide and sulfur in an aliphatic alcohol having dispersed therein an alkaline earth metal sulfide at a temperature ranging from about 25° C. to about 300° C.

References Cited in the file of this patent

UNITED STATES PATENTS

| | | |
|---|---|---|
| 2,080,360 | Lepsoe | May 11, 1937 |
| 2,728,638 | Morningstar | Dec. 27, 1955 |
| 2,767,059 | Adcock et al. | Oct. 16, 1956 |

OTHER REFERENCES

Mellor: Comprehensive Treatise on Inorganic and Theoretical Chemistry, vol. 5, pages 972–973, 1924.